Aug. 9, 1966 W. A. CARTER 3,265,843
FLOATING INSULATING SHIELD
Filed June 15, 1965 2 Sheets-Sheet 1

X 105 KV POSITIVE
O 105 KV NEGATIVE

RELATION OF DISTANCES
FOR IMPULSE WITHSTAND

INVENTOR.
WILLIAM A. CARTER
BY
OSTROLENK, FABER, GERB & SOFFEN
ATTORNEYS

Aug. 9, 1966  W. A. CARTER  3,265,843
FLOATING INSULATING SHIELD
Filed June 15, 1965  2 Sheets-Sheet 2
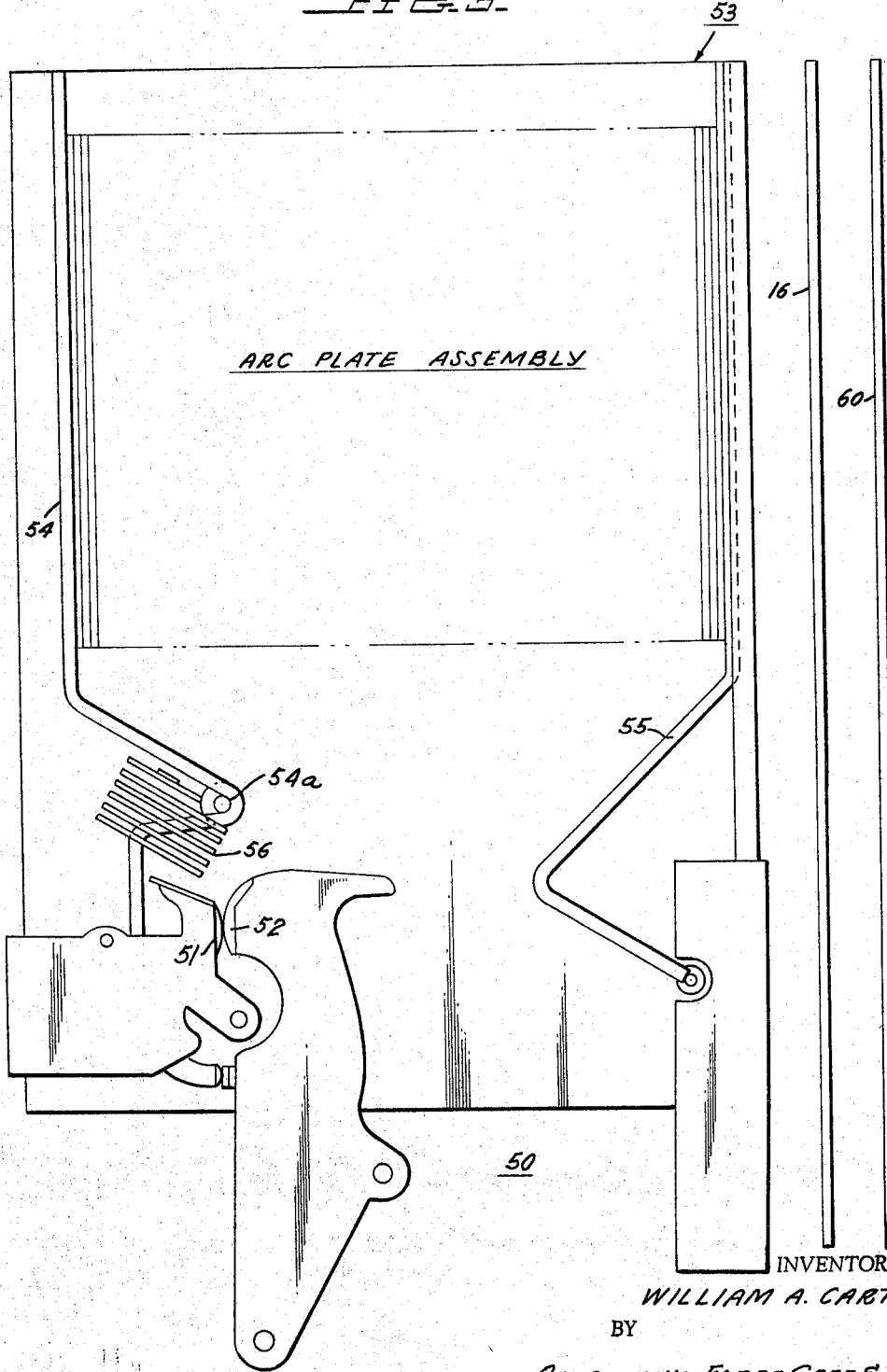
INVENTOR.
WILLIAM A. CARTER
BY
OSTROLENK, FABER, GERB & SOFFEN
ATTORNEYS

3,265,843
FLOATING INSULATING SHIELD
William A. Carter, Devon, Pa., assignor to I-T-E Circuit Breaker Company, Philadelphia, Pa., a corporation of Pennsylvania
Filed June 15, 1965, Ser. No. 469,039
4 Claims. (Cl. 200—151)

This invention is a continuation-in-part of application Serial No. 172,968, filed February 13, 1962, now abandoned, in the name of William A. Carter, and assigned to the assignee of the instant invention.

This invention relates to electrical apparatus and more particularly to an electrical structure wherein novel insulating means are provided which permits the placement of conductive elements of substantially large potential differences relatively close to one another, while at the same time preventing breakdown therebetween.

Electrically live parts of protective equipment are quite often positioned physically close to other metallic parts wherein a potential difference exists between these elements due to the potential differences of the elements themselves. Under such conditions the dielectric medium between such conductive elements is placed under an electric stress. In many instances this dielectric material is a gas such as, though not necessarily, air.

The potential differences between electrically live parts sets up an electric field intensity through the dielectric (i.e., gas) between these elements. As is well known, the field intensity E in a dielectric cannot be increased indefinitely; upon exceeding a threshold value a sparking phenomenon occurs, and the dielectric is said to "break down." The threshold field intensity, i.e., the intensity that a dielectric can withstand without breakdown, is called its dielectric strength. This dielectric strength, which has the units of volts/unit thickness, is directly proportional to the distance between the electrically live elements and the dielectric constant of the dielectric (i.e., the gas) itself, (assuming a linear distribution of potential gradient through the dielectric).

Upon occurrence of this threshold or breakdown voltage, an ionization phenomenon takes place, and an arc forms between the electrically live conductive elements, causing extreme damage to these elements and, due to the ionization occurring therebetween may affect other electrically live elements in the immediate vicinity, which may then assume undesirable potentials and eventually flashover due to the ionized gases present in the immediate region.

In order to prevent such occurrences in protective equipment, it is presently necessary to adopt excessive clearances (i.e., distances), between such live elements due to possible non-uniform field intensity distributions between such elements, which create regions of excessive stress in the dielectric media. Such a solution is diametrically opposed to the basic design factor of minimizing the physical size of such protective equipment in order to effect large savings in both materials employed and optimum space utilization. In order to attain such features in protective equipment, it is therefore necessary to reduce physical clearances between electrically live elements, while at the same time maintaining dielectric strength of a magnitude adequate to prevent any breakdown or flashover between these electrically live elements. In order to compensate for such reduced clearances, some of the methods employed are:

Covering the electrically live conductive elements with sufficient insulation to prohibit breakdown under conditions of excessive electric stress; placing electrically live parts physically far enough away from conducting surfaces of the opposite potential to insure against dielectric breakdown of the dielectric medium therebetween; employing stress relieving surfaces such as coatings, rings and so forth to reduce the degree of non-uniformity of the electrostatic field between live conductive elements.

The first solution, that is covering all live parts with a sufficient insulation to prohibit breakdown, is a rather cumbersome and costly operation, which should be avoided if a better solution exists. Placing physically live parts far enough away from the surfaces of live parts of opposite potential, although preventing breakdown between these elements, does not prevent breakdown between these elements and electrically live elements which, although the voltage drop therebetween may be smaller, are nevertheless physically closer to other electrically live elements, so that breakdown may still occur. Also, attempting to position elements having the greatest potential differences therebetween as far apart as possible unduly complicates the design of such protective equipment. Placing stress relieving surfaces, coatings, rings and so forth, in order to decrease the non-uniformity of the electrostatic fields set up between live elements having potential differences therebetween, is likewise an extremely cumbersome and complex solution, due to the complexity in mapping the electrostatic field itself, which becomes as tedious a job as that of properly positioning the stress relieving insulating surfaces to compensate for the non-uniform effects.

The electrostatic shielding arrangement employed in the instant invention provides the necessary protection against the possibility of a voltage breakdown, while at the same time allowing the electrically conductive elements to be spaced at distances which are substantially less than the spacings required between such elements in present protective apparatus arrangements.

To explain basically the arrangement of the instant application, a present approach will first be described. Assuming we have a conductive plate which is at ground or reference potential and that a conductive rod at a potential substantially greater than the reference potential is positioned with respect to the conductive plate so that its longitudinal axis is perpendicular to the surface of the plate and that its end nearest the plate is spaced a predetermined distance away from the plate. Starting with such an arrangement, the first objective is, with the distance between these elements being fixed, to substantially increase the breakdown voltage between these elements with the dielectric medium being air, for example. Although air is chosen, it should be understood that this in no way limits the employment of any other gaseous dielectric.

The obvious solution to this problem is the utilization of a solid dielectric material which is physically positioned between the metallic rod and metallic plate. The shield is most easily secured by adhering it, in any well known manner, directly to the surface of the flat metallic plate. It has been found, however, that this approach is not capable of allowing even a minor reduction in the clearance between the electrically live parts, even though the insulation covers a very large area of the conductive plate. Also, the insulating material drastically changes the field distribution of the electric field, increasing the voltage drop in the gaseous medium, thus enhancing rather than diminishing the possibility of a breakdown or flashover.

It has been found, however, that if the insulating material is positioned substantially parallel to and a predetermined distance away from the conductive plate, i.e., "floating" relative to the conductive plate, this permits a substantial diminution of the clearance of the metallic parts, while at the same time maintaining the same breakdown potential which is obtained by positioning the electrical elements a greater distance away in the complete absence of such an insulating sheet or in the presence of an insulating sheet which is directly affixed to the planar surface of the conductive plate.

It is therefore one object of this invention to provide an arrangement for electrical apparatus which employs a novel "floating" insulating shield which is positioned between electrically live elements so as to permit substantially reduced clearances between these elements, while at the same time providing adequate protection against a voltage breakdown between these elements.

Another object of this invention is to provide electrical apparatus having a "floating" insulating shield positioned between electrically live elements of the electrical apparatus, wherein the shield does not make direct contact with these electrically live conductive elements.

Another object of this invention is to provide electrical apparatus which includes a floating insulating shield, the surface of which does not make physical contact with either of the electrically conductive members and which is further positioned a predetermined distance away from the electrically live elements to permit a substantial diminution of the clearances between these elements, while at the same time maintaining adequate protection against breakdown between these elements.

These and other objects of this invention will become apparent when reading the ensuing disclosure and accompanying drawings in which:

FIGURE 3 is a side elevational view of a circuit breaker embodiment employing the floating insulating shield of this invention.

Figure 1A:
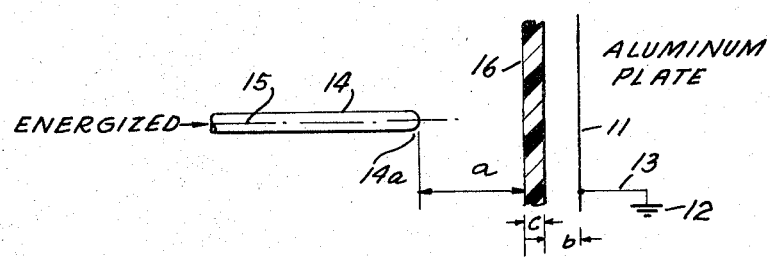
FIGURE 1a shows a test set-up employing the floating insulating shield of this invention.

Referring now to the drawings, FIGURE 1a shows a test set-up employed to obtain the clearances permissible between electrically live conductive parts in which the floating insulating shield has been employed. The arrangement 10 consists of a substantially flat aluminum plate 11 which is electrically connected to ground potential 12 by a conductive member 13. A metallic rod 14 is positioned with respect to the aluminum plate 11 so that its longitudinal axis 15 is perpendicular to the plane of the aluminum plate 11 and so that its tip 14a nearest the aluminum plate 11 is spaced a distance $a+c+b$ from the surface of aluminum plate 11. The shielding member 16, which is formed of a polyester glass in the present arrangement, but which may be formed of any similar dielectric, is positioned so that it is substantially parallel to the plane of aluminum plate 11 and so that it is a predetermined distance (a) away from rod 15 and (b) away from aluminum plate 11. In one preferred arrangement the thickness of plate 16 was chosen as 3/16" so that the distance from tip 14a of rod 14 to plate 11 is $a+b+3/16''$.

Figure 1B:
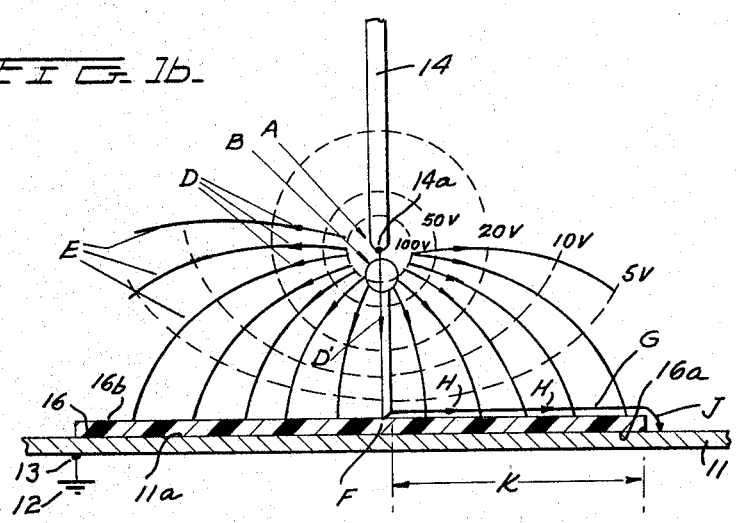
FIGURE 1b shows the field intensity, force lines and flashover path which occur when an impulse is impressed upon a set-up of the prior art.

Before discussing the results obtained in the setup of FIGURE 1a, the breakdown phenomenon of the prior art will first be described:

FIGURE 1b shows a setup similar to that of FIGURE 1a with the distinction being that the member 16 is positioned so that its lower surface 16a comes into direct contact with the upper surface 11a of conductive plate 11. In order to describe the electrical phenomenon which occurs with the setup of FIGURE 1b, the mode of breakdown will be compared to the occurrence of a lightning discharge.

Upon the occurrence of a lightning discharge in the region A which immediately surrounds the tip 14a of conductive rod 14, an extremely intense electrostatic field is generated in the region A of the electrode tip 14a. The electrostatic field lines 25 show the pattern of the electric field setup between the tip of rod 14 and the conductive plate 11, wherein it can be seen that the potential differences between field lines increases subtsantially in the region of the electrode tip 14a.

The intense field generates an ionized cloud of gas known as plasma, which appears in the region of the electrode tip 14a. The plasma consists of both positively and negatively charged particles (ions and electrons, respectively), with the majority of said particles being negatively charged. The intense electrostatic field in the region A greatly accelerates the negatively charged particles (i.e., the electrons) in this cloud B of gas in the direction of the electrode tip 14a. The high velocity movement of the negatively charged particles causes substantial amounts of shock ionization due to particle collisions in transit to the electrode tip 14a.

The positively charged particles or ions in the cloud B, due to the electrostatic field distribution, move along the force lines E and in a direction shown by the arrows D toward the more negative potential of the metallic plate 11. Due to the charge distribution of this cloud B, a self-propagating streamer or column of electrically charged particles is developed immediately behind the cloud B as it moves in a direction shown by arrow D' towards metallic plate 11. The cloud in moving towards plate 11 will be aided in its progress by electron emission, due to the increase in potential stress and the photo-ionization of the intervening space between electrode tip 14a and insulating sheet 16. As the lowermost point of cloud B, the closest proximity to the upper surface 16b of insulating sheet 16, arrives at the point F on insulating sheet surface 16b, this propagating ionization will then travel along the surface of the insulating sheet, as shown by line G and in the direction shown by arrows H on line G. This is due to a redistribution of electrical charges on the upper surface 11a of conductive sheet 11 in the immediate vicinity of the propagating ionization which is moving along the line G. This redistribution and clustering of the electrical charges on surface 11a may be thought of as a type of "mirror" image of the positive ions in cloud B, much in the same way that there is a "mirror" image in the earth for a transmission line being carried above the earth's surface. The redistribution of charges in the conductive material occurs at ultra-high speeds in the conductive material, thus aiding the propagation of the streamer or column moving along the line G until the propagation reaches the point J along line G, at which time it makes direct contact with the upper surface 11a of metallic plate 11. At this time the propagation which makes contact with the metallic plate 11 causes a full rupture of the gaseous medium (i.e., air), thereby resulting in a breakdown or flashover. Extensive tests have indicated that such a flashover travels distances K in excess of ten times normal along the surface of an insulation sheet such as the sheet 16, due to the presence of a conductor which is in physical contact with the back surface 16a of the insulating sheet 16.

By placing the insulating sheet 16 a predetermined distance (b) away from the surface of the conducting sheet 11, as is shown in the test configuration of FIGURE 1a, a redistribution of stresses in the dielectric medium (i.e., the gas) occurs in all portions of the series insulation between the electrode tip 14a and the conductive plate 11, thus removing the influence of charge redistribution within the conducting plate 11, such as occurs in the setup of FIGURE 1b. It is as if the insulating sheet 16 makes it difficult for the ions in cloud B to "see" their mirror image electrons in conducting sheet 11 and thereby prevents redistribution of the electrons on the surface 11a.

Figure 2:
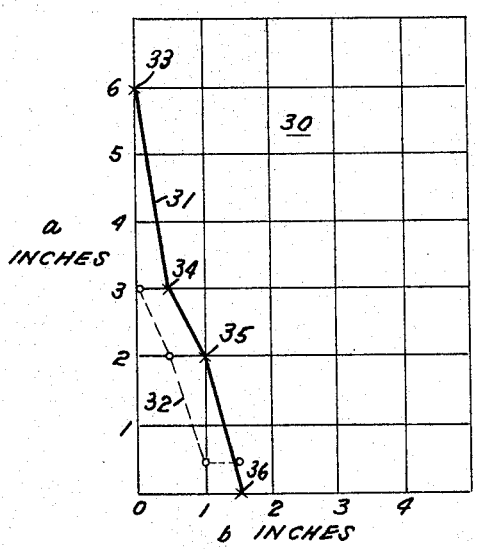
FIGURE 2 is a chart showing the plot of the clearance between the floating insulating shield and the aluminum plate versus the clearance between the floating insulating shield and the metallic rod for a constant impulse impressed between the plate and the rod.

As can be seen from the test result plot of FIGURE 2, with the shield 16 placed in direct physical contact with conductive plate 11 (see point 33 on curve 31 of chart 30), the electrode tip 14a of rod 14 must be separated by a distance of at least 6" to sustain an impulse of 105 kilovolts between rod 14 and conductive plate 11.

By increasing the distance between shield 16 and conductive plate 11 from 0 as shown by point 33 on curve 31 to a distance of approximately 0.5" from plate 11, as shown by point 34 on curve 31, it can be seen that the minimum distance between shield 16 and electrode tip 14a is reduced to 3″, which is substantially less than the distance required when shield 16 is in direct physical contact with conductive plate 11, such as shown by point 33 on curve 31. The optimum condition as shown on curve 31 is such that upon moving plate 16 a distance 1.5″ away from metallic plate 11 (point 36 on curve 31), electrode tip 14a may come into direct physical contact with shield 16 so that its overall distance from metallic plate 11 is 1½ + 3/16″, or a total distance of 1 11/16″, which it can be seen is substantially less than the clearances needed in the arrangement employed in FIGURE 1b. A similar curve 32, shown in chart 30, was obtained by placing a negative impulse upon rod 14 in which substantially similar results were obtained. Thus, as can be seen from chart 30, reductions as high as four times in clearance distances between metallic members 11 and 14 are possible with the employment of the arrangement shown in FIGURE 1a. It should be noted that although the laboratory test arrangement employed in FIGURE 1a further employed a dielectric medium of air, in order to obtain the results plotted in FIGURE 2, the phenomenon resulting from the apparatus of FIGURE 1a is not restricted to employment in a dielectric medium of air, but like results are obtainable with the employment of any solid insulation material in any gaseous dielectric.

FIGURE 3 shows how the theory of the floating insulating shield or barrier 16 is employed in an actual circuit breaker 50. Basically the circuit breaker consists of a pair of cooperating contacts 51 and 52, which are operable to disengage in any well known manner upon the occurrence of an overvoltage or short circuit condition in the circuit (not shown) which the circuit breaker is designed to protect. An arc chute 53, positioned in close proximity to the cooperating contacts 51 and 52, is designed to receive an arc which forms between the cooperating contacts upon separation thereof so as to cool and ultimately interrupt it. The arc runners 54 and 55 are positioned at opposite ends of the arc chute 53 in order that the arc (not shown) may transfer from the opened cooperating contacts 51 and 52 and so that the arc may be urged upwardly through the arc chute 53. A jump gap 56, positioned between the lower edge 54a of arc runner 54 and the stationary cooperating contact 51 is employed to permit transfer of the arc from fixed or stationary contact 51 to the lower edge 54a of arc runner 54 and to prevent any arcing between the lower edge 54a of arc runner 54 and cooperating contact 51 subsequent to the transfer of the arc to arc runner 54. The operation set forth immediately above is well known in the prior art, and none of the structure of the circuit breaker lends any novelty to the instant invention, and it should be understood that any prior art circuit breaker arrangement may be employed in place of the circuit breaker 50 shown in FIGURE 3.

In order to prevent any harm from occurring to equipment operators who may, through the course of their employment, be required to come in close proximity to the protective equipment, a grounded front cover 60 is employed to surround the circuit breaker 50. The front cover 60 is placed at ground potential so that the operator is not exposed to any harmful voltage potentials.

However, since the grounded front cover 60 sets up an electric field between itself and the live electrical parts of the circuit breaker, such as, for example, the cooperating contacts 51–52, the arc runners 54–55 or any other electrically live members of the circuit breaker 50, a floating insulating shield 16 is employed and is positioned at predetermined distances between the circuit breaker 50 and grounded front cover 60, which distances are determined in the manner shown by the curves of FIGURE 2. The employment of insulating shield 16 thereby greatly reduces the clearances needed between the circuit breaker and the grounded front cover 60, in order to maintain adequate breakdown voltage protection therebetween. The preferred range of distance between the grounded front cover 60 and the insulating shield 16 for the circuit breaker in which the instant invention has found application has been determined to be between 3/8 and 5/8 of an inch. Below 3/8 of an inch the structure does not adequately prevent breakdown for high potential differences and beyond 5/8 of an inch the amount of increased protection is relatively small for increasing distance.

It can therefore be seen that I have provided a novel floating field arrangement which, while substantially reducing clearances between live metallic elements having substantial voltage drops therebetween still adequately maintains the necessary voltage breakdown protection between these metallic elements. Although preferred embodiments of this novel invention have been described herein, many variations and modifications will now be obvious to those skilled in the art, and it is preferred therefore to be limited not by the specific disclosure herein but only by the appended claims.

What is claimed is:

1. An arrangement for increasing the breakdown voltage between conductive elements of an electrical apparatus in a dielectric medium comprising, a first conductive member in said dielectric medium being at a first potential level, a second conductive member in said dielectric medium being a predetermined distance away from said first conductive member, said second conductive member being at a second potential level different from said first potential level, said potential levels creating a potential drop between said first and second conductive members thereby creating an electric stress between said conductive members, a floating dielectric insulating shield interposed between said conductive members and being a predetermined distance away from both said conductive members for decreasing the electric stress without increasing the separation between said conductive members, said floating dielectric insulating shield being preferably spaced from said second conductive member by a distance within the range of 3/8 to 5/8 of an inch regardless of the magnitude of said potential drop between said first and second conductive members.

2. Electrical apparatus in a dielectric medium comprising, a conductive plate connected to a reference potential, a conductive element having a first end spaced apart from said conductive plate and being connected to a potential differing from said reference potential thereby creating a potential stress between said plate and said conductive element, an insulating shield spaced and positioned between said conductive plate and said conductive element so that said shield makes no physical contact with said plate and said conductive element for substantially decreasing the electric stress between said plate and said element without increasing the space between said plate and said element, said shield being preferably spaced from said conductive plate by a distance within the range of 3/8 to 5/8 of an inch regardless of the magnitude of said potential stress between said plate and said conductive element.

3. Electrical apparatus in a dielectric medium comprising, a circuit interrupter for protecting an electrical circuit, said circuit breaker having conductive elements developing substantially large electric potentials during operation thereof, a grounding shield positioned outside of said circuit interrupter for protecting the region surrounding said circuit interrupter from exposure to said large electric potentials, a floating insulating shield interposed between said grounding shield and said circuit interrupter for substantially decreasing electrical stresses created due to the substantially large potentials existing between said interrupter and said grounding shield without increasing the distances between said grounding shield and said circuit interrupter, said insulating shield being positioned a predetermined distance away from both said circuit interrupter and said grounding shield, said predetermined distance of said insulating shield from said grounding shield preferably being within the range of 3/8 to 5/8 of an inch regardless of the magnitudes of said potentials existing between said interrupter and said grounding shield.

4. Electrical apparatus in a dielectric medium of air comprising, a circuit interrupter for protecting an electrical circuit, said circuit breaker having conductive elements developing substantially large electric potentials during operation thereof; a grounding shield positioned outside of said circuit interrupter for protecting the region surrounding said circuit interrupter from exposure to said large electric potentials, a floating insulating shield interposed between said grounding shield and said circuit interrupter for substantially decreasing the electrical stresses created due to the substantially large potentials existing between said interrupter and said grounding shield without increasing the distances between said grounding shield and said circuit interrupter, said insulating shield being a substantially flat sheet positioned substantially parallel to said grounding shield, said insulating shield being positioned a predetermined distance away from both said circuit interrupter and said grounding shield, said predetermined distance of said insulating shield from said grounding shield being within the range of 3/8 to 5/8 of an inch regardless of the magnitudes of said potentials existing between said interrupter and said grounding shield.

References Cited by the Examiner

UNITED STATES PATENTS

| | | | |
|---|---|---|---|
| 1,180,805 | 4/1916 | Troger | 200—150 |
| 1,193,694 | 8/1916 | Jacobs | 200—150 |
| 1,866,495 | 7/1932 | Wedmore | 200—150 |
| 1,930,026 | 10/1933 | Aalborg | 200—150 |
| 2,026,060 | 12/1935 | Pratt | 174—35.4 |
| 2,668,891 | 2/1954 | Driescher | 200—151 |
| 2,697,212 | 12/1954 | Castelli | 200—151 |

FOREIGN PATENTS

| | | |
|---|---|---|
| 602,039 | 9/1934 | Germany. |
| 626,424 | 2/1936 | Germany. |

ROBERT K. SCHAEFER, *Primary Examiner.*

ROBERT S. MACON, *Examiner.*